May 15, 1934.　　　R. T. CHEESEMAN　　　1,959,196
ELECTRICAL REGULATING ARRANGEMENT
Filed Feb. 4, 1931　　　2 Sheets-Sheet 1

Inventor:
Ralph T. Cheeseman,
by Charles E. Tullar
His Attorney.

Patented May 15, 1934

1,959,196

UNITED STATES PATENT OFFICE 1,959,196

ELECTRICAL REGULATING ARRANGEMENT

Ralph T. Cheeseman, Lynn, Mass., assignor to General Electric Company, a corporation of New York Application February 4, 1931, Serial No. 513,381

12 Claims. (Cl. 175—363)

My invention relates to electrical regulating arrangements and more particularly to improvements in voltage regulating means for power converting apparatus, such as rectifiers for battery charging.

It is often desirable to regulate the output voltage of electrical power converting or transforming devices. This is particularly desirable in connection with battery charging devices for the output voltages of such devices should be changed whenever the number of batteries to be charged is changed as well as when it is desired to change the charging rate. Many possible ways of varying or regulating the output voltage of such devices are known. The problem, therefore, is not merely to provide a voltage regulating means but to provide regulating means of maximum simplicity, range and fineness of regulation combined with minimum cost.

In accordance with my invention I provide extremely simple voltage regulating means which, when applied to rectifiers of the type having a hot filament rectifier tube that is energized from a separate filament transformer winding, requires the minimum of additional parts for the fineness of regulation attained. More particularly, I successively use the filament transformer winding for producing intermediate output voltages for regulating purposes.

An object of my invention is to provide new and improved means for regulating the voltage of electric power converting or transforming devices.

Another object of my invention is to increase the number of voltage regulating steps attainable by tap changing in battery chargers employing a transformer and a hot cathode rectifier tube.

My invention will be better understood from the following description taken in connection with the accompanying drawings and its scope will be pointed out in the appended claims.

Figure 1:
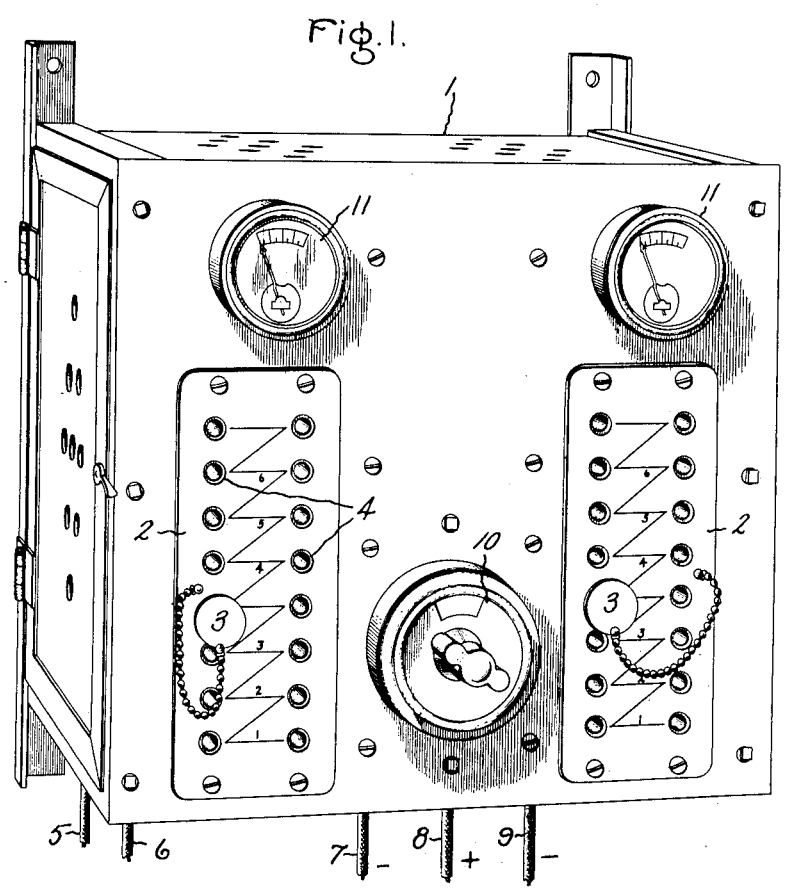
Figure 2:
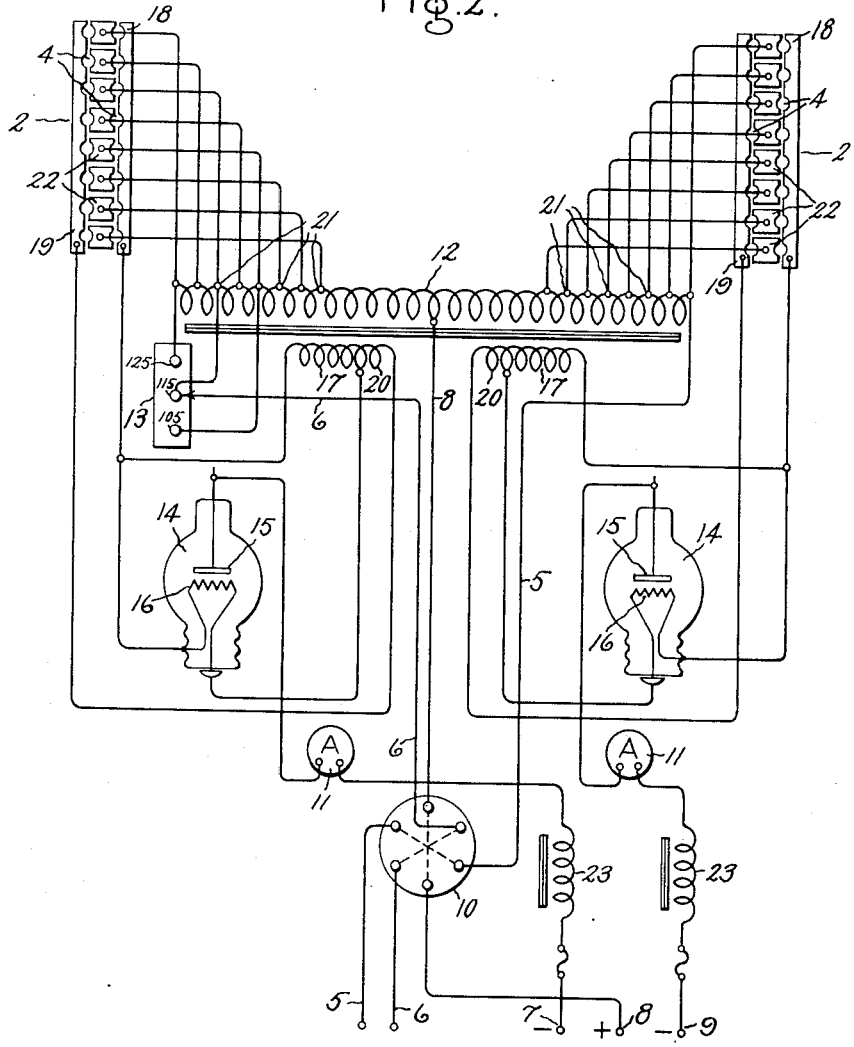

In the drawings, Fig. 1 is a perspective view of a full wave rectifier battery charger equipped with my invention, while Fig. 2 is a circuit diagram of the connections of the charger illustrated in Fig. 1.

Referring now to Fig. 1, 1 is the enclosing casing for the charger, on the front of which are mounted a pair of similar voltage control panels or plug boards 2. The reason that two control panels are shown is that the charger comprises two separate half wave rectifying sets, which may, if desired, be connected to separate loads, or which, if desired, may also be connected together to a single load in which case the two rectifiers will act as a full wave rectifier. In the following description therefore duplicate parts of the two half wave rectifier sets will be designated by similar reference characters and only one set will be described in detail. Control panel 2 comprises essentially a movable plug member 3 and cooperating socket 4. In the illustrated embodiment these sockets are so arranged that when plug 3 is moved from socket to socket along the zig-zag line joining them the voltage is increased in small steps as the plug moves upwardly and is decreased as the plug moves downwardly. Preferably the arrangement is such that if the plug is moved vertically between adjacent sockets in the right hand column, the voltage of the rectifier is changed an amount approximately equal to the voltage of one battery, while if it is moved horizontally from a right hand plug to a left hand plug the voltage is increased an intermediate amount in order to regulate the battery charging rate.

Leads 5 and 6 are the alternating current input leads, while leads 7, 8 and 9 are the direct current output leads. A suitable switch 10 is provided and this switch is so arranged that it simultaneously makes or breaks both the alternating current and the direct current circuits. Ammeters 11 are mounted on the front of the casing 1. They are connected respectively in the direct current half wave output circuits.

Referring now to Fig. 2, it will be seen that the input alternating current leads 5 and 6 are connected, through switch 10, to energize a transformer 12, which in the illustrated embodiment is shown as an auto-transformer, but which obviously may also be a two-winding transformer if desired. A voltage adjusting panel 13 is connected between lead 6 and the left hand end of the winding of transformer 12. As shown, this panel has a plurality of contacts which are connected to taps on the transformer winding. The purpose of this panel is to compensate for different voltage alternating current supply circuits to which the charger may be connected. Thus, for example, constant direct current output voltage will be obtained if the input voltage is 105 volts provided conductor 6 is connected to the lower contact of panel 13, while if the input voltage is 115 volts conductor 6 should be connected to the mid-contact of panel 13, while if the input voltage is 125 conductor 6 should be connected to the upper contact of panel 13.

The rectifying devices of the charger preferably comprise a pair of two-element rectifier valves 14 consisting of anodes 15 and filamentary cathodes 16 in a low pressure atmosphere of inert gas. Filaments 16 are energized from filament transformer windings 17.

The operation of these rectifier valves is well understood by those skilled in the art and depends upon the fact that the incandescent cathode 16 emits electrons which ionize the surrounding gas, thus producing a unidirectional conducting path between the anode and the cathode of the tube. In carrying out the present application of my invention, the cathode or filament 16 is connected directly to an elongated contact 18 of the voltage control panel, while at the same time this cathode is connected through a portion 20 of the filament transformer winding 17 to an elongated contact 19 of this panel.

Voltage regulating taps 21 are provided on the transformer 12 and these taps are connected to individual contacts 22 of the panel 2.

A pair of reactors 23 are connected respectively in the half wave direct current circuits. These reactors perform the function of securing the desired taper of the current when a storage battery is being charged.

The operation of the illustrated embodiment of my invention is as follows. Assume that conductors 5 and 6 are connected to a suitable source of alternating current, that plug 3 (see Fig. 1) is in the socket between the lower contact 22 and contact 18 of the voltage control panel and that a suitable load such as a storage battery is connected between the direct current output terminals 8 and 9 for example. Assume also that switch 10 is in its closed or on position. Under these circumstances transformer 12 will be energized and filament 16 will be heated to the proper temperature by filament winding 17. The direct current circuit will then be as follows in the direction of current flow therein. From negative conductor 9 through reactor 23, ammeter 11, rectifier 14, contact 18, contact 22, to transformer 12, through conductor 8 and switch 10 to the other direct current terminal. The voltage of this circuit will be produced by that portion of the transformer winding 12 between the point where conductor 8 connects with it and the innermost right hand tap 21. If now it is desired to increase the voltage in a fairly large step, say for example two volts, plug 3 will be moved vertically to the next upper socket 4 between contact 18 and contact 22. This obviously increases the output voltage of the charger an amount equal to the voltage of the transformer between the two innermost taps 21. If, on the other hand, it is desired only to increase the voltage of the charger slightly, plug 3 would be moved between lowermost contact 22 and contact 19 of panel 2. This would have the effect of introducing a portion 20 of filament winding 17 into the charging circuit and thus producing a slight voltage boost. Thus the circuit will now be from cathode 16 through a portion 20 of winding 17 to contact 19 and then through contact 22 to the innermost tap of transformer 12. It will be obvious to those skilled in the art that by suitably placing plug 3 in the sockets 4 of panel 2 a great variety of voltages may be obtained, and that in the illustrated embodiment it is possible to obtain sixteen different output voltages with only eight taps on the main transformer winding, for each half wave rectifier set.

When it is desired to use the charger as a full wave rectifier the load is connected between positive lead 8 on the one hand and negative leads 7 and 9 connected together on the other hand.

While I have shown and described a particular embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States is:

1. In combination, voltage producing means for supplying energy to an electric circuit, means for varying the voltage of said means, voltage producing means associated with said first mentioned means for supplying energy to another circuit whose energization controls the conductivity of said first mentioned circuit, and means for employing the voltage of said last mentioned means for varying the voltage of said first mentioned circuit.

2. In combination, an electric circuit, means for varying the voltage of said circuit, a translating device connected to said circuit, said device having an element requiring energization before said device will operate, means for supplying energy to said element from said first mentioned means, and means connecting said last mentioned means to said circuit in such a manner that it can also vary the voltage of said circuit.

3. In combination, a transformer having two windings for delivering current to separate load circuits, means for varying the voltage of one of said windings with respect to its load circuit, and means for selectively connecting a part of said other winding to said last mentioned load circuit.

4. In combination, a transformer having two separate windings for delivering current respectively to a direct current load circuit and an alternating current load circuit, means for varying the voltage of the winding connected to the direct current circuit, and means for selectively connecting a part of the winding which is connected to the alternating current circuit in said direct current circuit.

5. In a battery charger of the type having means for energizing the cathode of a hot cathode rectifier, means for varying the voltage of said charger in a plurality of steps, and means including said cathode energizing means for doubling said number of steps.

6. In combination, a transformer and a hot cathode rectifier, said transformer having a main winding provided with taps and an auxiliary winding provided with taps, said auxiliary winding being connected to energize the cathode of said rectifier, a load circuit including said main winding and rectifier, means for regulating the voltage of said load circuit by tap changing on said main winding, and means for inserting a portion of said auxiliary winding in said load circuit before said first mentioned means goes from one tap to the next on said main winding.

7. In combination, a battery charger comprising a transformer and a two element hot cathode rectifier valve, a filament transformer winding for energizing said cathode, a plurality of taps on said transformer for obtaining a variable output voltage of said charger and taps on said filament transformer winding for obtaining output voltages of said charger which are intermediate the voltages obtainable from said first mentioned taps.

8. In combination, an electric power converting apparatus including a circuit having a main voltage producing source, means for regulating the voltage of said source, an auxiliary voltage producing source for an auxiliary device of said converting apparatus, and means for selectively connecting and disconnecting said last mentioned source to and from said circuit.

9. An electric power converting apparatus having voltage control means including a multi-contact voltage control panel, movable means associated with the contacts of said panel for changing the voltage control connections, said contacts being so arranged that movement of said movable means in one direction causes relatively large incremental voltage changes while movement of said means in another direction causes relatively small incremental voltage changes.

10. A battery charger having, in combination, an enclosing casing, a multi-contact voltage control panel on the front of said casing, movable means associated with said panel for making different voltage connections, the contacts of said panel being so arranged that when said last mentioned means is moved in one path the voltage changes in steps substantially equal to the voltage of one battery and when said means is moved in another path intermediate voltages are obtained.

11. In combination, an alternating current supply circuit, a direct current load circuit, a transformer connecting said circuits, a hot cathode rectifier in said load circuit, a cathode heating transformer winding on said transformer for energizing the cathode of said rectifier, taps on said transformer, tap changing means for varying the voltage of said direct current circuit, and means for selectively connecting a part of said cathode heating winding in said direct current load circuit in order to secure load voltage changes intermediate those obtainable from said taps.

12. A battery charger having, in combination, an alternating current supply circuit, a direct current load circuit, an auto-transformer connecting said circuits, a plurality of taps for connecting said supply circuit to different amounts of said transformer winding whereby a substantially constant direct current voltage is obtainable from different alternating current voltage sources, a hot filament type rectifier tube in said direct current load circuit, a filament heating winding on said transformer, additional taps on said transformer, means including said last mentioned taps for connecting different amounts of said transformer in said load circuit for voltage control purposes, and means for selectively connecting a part of said filament heating winding in said load circuit in order to secure load voltages intermediate to those secured from the taps on said transformer.

RALPH T. CHEESEMAN.